United States Patent
Wang et al.

(10) Patent No.: US 11,301,953 B2
(45) Date of Patent: Apr. 12, 2022

(54) MAIN VIEWPOINT-BASED PANORAMIC VIDEO MAPPING METHOD

(71) Applicant: PEKING UNIVERSITY SHENZHEN GRADUATE SCHOOL, Shenzhen (CN)

(72) Inventors: Ronggang Wang, Shenzhen (CN); Yueming Wang, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 19 days.

(21) Appl. No.: 16/650,141

(22) PCT Filed: May 29, 2018

(86) PCT No.: PCT/CN2018/088806
§ 371 (c)(1),
(2) Date: Mar. 24, 2020

(87) PCT Pub. No.: WO2019/062177
PCT Pub. Date: Apr. 4, 2019

(65) Prior Publication Data
US 2021/0192678 A1    Jun. 24, 2021

(30) Foreign Application Priority Data

Sep. 26, 2017 (CN) .......................... 201710882161.1

(51) Int. Cl.
*G06T 3/00* (2006.01)
*G06T 3/40* (2006.01)

(52) U.S. Cl.
CPC .......... *G06T 3/0031* (2013.01); *G06T 3/4007* (2013.01); *G06T 3/4038* (2013.01)

(58) Field of Classification Search
CPC ....... G06T 3/00; G06T 3/0031; G06T 3/4007; G06T 3/4038
See application file for complete search history.

(56) References Cited

U.S. PATENT DOCUMENTS

| 9,478,051 B2 | 10/2016 | Li et al. | |
|---|---|---|---|
| 2014/0169699 A1* | 6/2014 | Li | G06T 3/00 382/285 |

(Continued)

FOREIGN PATENT DOCUMENTS

| CN | 104376591 A | 2/2015 |
|---|---|---|
| CN | 104637061 A | 5/2015 |

(Continued)

OTHER PUBLICATIONS

Li, Lulu, "(Flat Mirror Stitching Measurement Study Based on Structured Light Reflection)" (China Doctoral Dissertations Full-Text Database), No. 2016-07, Jul. 31, 2016 (Jul. 31, 2016), ISSN: 1674-022X.

*Primary Examiner* — John B Strege
(74) *Attorney, Agent, or Firm* — Miles & Stockbridge P.C.

(57) ABSTRACT

Disclosed are a panoramic video asymmetrical mapping method and a corresponding inverse mapping method that include mapping a spherical surface corresponding to a panoramic image or video A onto a two-dimensional image or video B, projecting the spherical surface onto an isosceles quadrangular pyramid with a square bottom plane, and further projecting the isosceles quadrangular pyramid onto a planar surface, using isometric projection on a main viewpoint region in the projection and using a relatively high sampling density to ensure that the video quality of the region of the main viewpoint is high, while using a relatively low sample density for non-main viewpoint regions so as to reduce bit rate. The panoramic video asymmetrical inverse (Continued)

mapping technique provides a method for mapping from a planar surface to a spherical surface, and a planar surface video may be mapped back to a spherical surface for rendering and viewing.

9 Claims, 4 Drawing Sheets

(56) References Cited

U.S. PATENT DOCUMENTS

2019/0174116 A1* 6/2019 Oh ..................... H04N 19/597
2020/0177925 A1* 6/2020 Zhu ..................... G06T 3/0031

FOREIGN PATENT DOCUMENTS

| CN | 104939828 A | | 9/2015 |
| CN | 105898254 A | * | 8/2016 |
| CN | 107622474 A | | 1/2018 |

* cited by examiner

MAIN VIEWPOINT-BASED PANORAMIC VIDEO MAPPING METHOD

CROSS-REFERENCE TO RELATED APPLICATIONS

This application is a national stage filing under 35 U.S.C. § 371 of PCT/CN2018/088806, filed on May 29, 2018 which claims priority to CN Application No. 201710882161.1 filed on Sep. 26, 2017. The applications are incorporated herein by reference in their entirety.

FIELD

The present disclosure generally relates to a field of virtual reality (VR) video technology, specifically relates to a novel main viewpoint-based panoramic video mapping method and a corresponding inverse mapping method, the mapping technology is used for panoramic video, and in the premise of ensuring that the quality of the main viewpoint region of the panoramic video is unchanged, the file size and the coding bit rate of the panoramic video can be greatly reduced.

BACKGROUND

With the development of virtual reality video, the demand for virtual reality video is increasing. Compared with a traditional video with a view angle of about 100 degrees or more, a virtual reality video need to provide a view angle of 360 degrees, therefore, a virtual reality video requires a greater resolution. In addition, virtual reality videos usually need to be watched on head-mounted devices, and in order to avoid causing dizziness to the user, the suggested frame rate needs to be above 60 frames per second, or even 120 frames per second. Due to the increase in resolution and frame rate, the bit rates required for a virtual reality video coding is also greatly increased compared to a traditional video.

Although the virtual reality video provides a view angle of 360 degrees, the user will only watch the image in a vicinity of one viewpoint for a short period of time, and this viewing direction is called the main viewpoint of the user. In view of this feature, asymmetric mapping technology and stream switching technology are proposed to achieve the purpose of saving bit rates. The asymmetric mapping technique uses a higher sampling density to sample a main viewpoint region, while uses a lower sampling density to sample other regions. The stream switching technology encodes and stores multiple bit streams of asymmetrically mapped video with different main viewpoints on a server end, and the client chooses to receive the corresponding bit stream according to the position of the user's viewpoint.

Although the asymmetric mapping technology and the stream switching technology may increase the storage and coding cost of the server side, network transport cost and decoding complexity of the client can be effectively reduced, which is effective in one-to-many application scenarios. However, the coding efficiency of the prior asymmetric mapping technology is low, and it needs to be improved.

SUMMARY

To overcome the drawbacks in the existing technologies, to further improve coding efficiency of the asymmetric mapping technology, the present disclosure provides a panoramic video asymmetrical mapping method and a corresponding inverse mapping method. While ensuring that the video quality of the region of the main viewpoint remains unchanged, the present panoramic video asymmetrical mapping technique greatly reduces the resolution of the remaining regions in the video, effectively reducing the bit rate required for encoding a virtual reality video. The panoramic video asymmetrical inverse mapping technique provides a method for mapping from a planar surface to a spherical surface, and by means of said method, a planar surface video may be mapped back to a spherical surface for rendering and viewing.

The technical solution provided by the present invention is:

A novel main viewpoint-based panoramic video asymmetrical mapping method, mapping a spherical surface corresponding to a panoramic image or video A onto a two-dimensional image or video B; projecting the spherical surface onto an isosceles quadrangular pyramid with a square bottom plane, and further projecting the isosceles quadrangular pyramid onto a planar surface; using isometric projection on a main viewpoint region in the projection and using a relatively high sampling density to ensure that the video quality of the region of the main viewpoint is high, while using a relatively low sample density for non-main viewpoint regions so as to reduce bit rate. Specifically, a right-handed coordinate system is established based on the sphere center O, wherein the Z axis points to the direction at longitude and latitude of (0°, 0°) of the spherical surface, the Y axis points to the direction of the north pole of the spherical surface, and the X axis points to the direction at longitude and latitude of (90°, 0°) of the spherical surface. Then, a quadrangular pyramid W is established, wherein, the center of the bottom plane of the quadrangular pyramid W is on the positive Z axis, the apex is on the negative Z axis, and the base edges are respectively parallel to the X axis and parallel to the Y axis; the connecting line between the center D of the bottom plane of the quadrangular pyramid and the sphere center O is denoted as $l_1$, and the connecting line between the midpoint of a base edge of the quadrangular pyramid and the sphere center O is denoted as $l_2$, and the angle formed by $l_1$ and $l_2$ is $\theta$; the bottom plane of the quadrangular pyramid is denoted as plane I'', the side surface intersecting with the positive X axis is denoted as plane II'', the side surface intersecting with the positive Y axis is denoted as plane III'', the side surface intersecting with the negative X axis is denoted as plane IV'', and the side surface intersecting with the negative Y axis is denoted as plane V''. When the pitch angle, the yaw angle and the roll angle of the main viewpoint are respectively $\beta_1$, $\beta_2$ and $\beta_3$, a corresponding quadrangular pyramid Q' is obtained by rotating the quadrangular pyramid Q about the sphere center O by ($\beta_1$, $\beta_2$, $\beta_3$). The sphere center O and the four base edges of the quadrangular pyramid Q' form four sector planes, and the four sector planes divide the spherical surface into two regions. Wherein, one region including the main viewpoint is referred to as the main viewpoint region, and the main viewpoint region corresponds to the bottom plane of the pyramid and is denoted as region I, and the other regions are referred to as the non-main viewpoint regions; the sphere center O and four side edges of the quadrangular pyramid Q' form four sector planes, which further divide one non-main viewpoint region into four sub-regions, and the four sub-regions respectively correspond to the four side surfaces II'', III'', IV'' and V'', and are respectively referred to as regions II, III, IV and V. The mapping method of the present invention maps the described region I onto a rectangular plane I' with a resolution of $W_I \times H_I$, and maps the regions II, III, IV and V onto four isosceles triangular planes II', III', IV', and V', wherein the base edge and the height of the four isosceles triangular planes are respectively $$W_{II'} \times \frac{H_{II'}}{2}, H_{II'} \times \frac{W_{II'}}{2}, W_{II'} \times \frac{H_{II'}}{2}, H_{II'} \times \frac{W_{II'}}{2},$$

and then the four isosceles triangular planes are spliced into a rectangular plane VI' with a resolution of $W_{II'} \times H_{II'}$. The parameters $\theta$, $W_{I'}$, $H_{I'}$, $W_{II'}$, $H_{II'}$, $\beta_1$, $\beta_2$, and $\beta_3$ can be set as required. The rectangular plane I' and rectangular plane VI' are the two-dimensional image or video B obtained by mapping.

The mapping formats of panoramic image A comprises a longitude and latitude image, a cube-mapped image, or a panoramic video captured by a multi-channel camera, but is not limited thereto. The two-dimensional image or video B includes the rectangular plane I' and the rectangular plane VI'.

For the panoramic image mapping method, specifically, the mapping a spherical surface corresponding to a panoramic image or video A onto a two-dimensional image or video B including the following steps:

First step: for each pixel in the rectangular plane I', according to its coordinate $(X_{I'}, Y_{I'})$ in the plane I', calculating its corresponding coordinate "Coordinate'" in the bottom plane of the quadrangular pyramid Q', then further calculating its corresponding coordinate "Coordinate" on the spherical surface according to the perspective projection method, and finally according to the spherical coordinate "Coordinate", taking the pixel value of the corresponding position (or the corresponding pixel value obtained based on neighbor pixels by interpolation) on the spherical surface, as the pixel value of the pixel $(X_{I'}, Y_{I'})$ in the plane I'. The specific steps to calculate the spherical coordinate "Coordinate" according to the plane coordinate $(X_{I'}, Y_{I'})$ are as follows:

(1.1) the point, corresponding to the point in the plane I' with the coordinate $(X_{I'}, Y_{I'})$, in the bottom plane of the quadrangular pyramid Q' is denoted as $A_{I'}$, the connecting lines between the midpoints of the opposite base edges of the quadrangular pyramid Q' are denoted as $m_1$ and $m_2$, the projections of the point $A_{I'}$ on $m_1$ and $m_2$ are respectively denoted as $B_{I'}$ and $C_{I'}$, and the center of the bottom plane of the quadrangular pyramid Q' is denoted as D, and the position of $A_{I'}$ can be determined based on the angle $B_{I'}OD$ and the angle $C_{I'}OD$; in the present invention, the magnitudes of the angle $B_{I'}OD$ and the angle $C_{I'}OD$ can be calculated based on the value of $(X_{I'}, Y_{I'})$, the magnitude of the angle $B_{I'}OD$ and the value of $X_{I'}$ are in a relationship of a linear function, and the magnitude of the angle $C_{I'}OD$ and the value of $Y_{I'}$ are in a relationship of a linear function;

(1.2) The coordinate of $A_{I'}$, "Coordinate'", is determined according to the magnitude of the angle $B_{I'}OD$, the magnitude of the angle $C_{I'}OD$ and the values of $\beta_1$, $\beta_2$ and $\beta_3$;

(1.3) According to the coordinate of the point $A_{I'}$, the coordinate of the intersection of the ray $\overrightarrow{OA_{I'}}$ and the spherical surface, "Coordinate", is obtained.

Second step: for each pixel in the four isosceles triangular planes II', III', IV' and V', according to its coordinate $(X_{II'}, Y_{II'})$ (the X and Y coordinate axes are respectively perpendicular to and parallel to the base of the isosceles triangle), calculating its corresponding coordinate "Coordinate'" on the side surface of the quadrangular pyramid Q', then further calculating its corresponding coordinate "Coordinate" on the spherical surface according to the perspective projection method, and finally according to the spherical coordinate "Coordinate", taking the pixel value of the corresponding position (or the corresponding pixel value obtained based on neighbor pixels by interpolation) on the spherical surface, as the pixel value of the pixel $(X_{II'}, Y_{II'})$. The specific steps to calculate the spherical coordinate "Coordinate" according to the plane coordinate $(X_{II'}, Y_{II'})$ are as follows:

(2.1) The point, corresponding to the pixel $(X_{II'}, Y_{II'})$, on the side surface of the quadrangular pyramid Q' is denoted as $A_{II'}$, the connecting line between the midpoint of the base edge of the side surface and the apex of the quadrangular pyramid Q' is denoted as $n_1$, and the connecting line between the center of the bottom plane and the apex of the quadrangular pyramid Q' is denoted as $n_2$, and the projections of point $A_{II'}$ on $n_1$ and $n_2$ are denoted as $B_{II'}$ and $C_{II'}$, respectively, and the center of the bottom plane of the quadrangular pyramid Q' is denoted as D, and the position of $A_{II'}$ can be determined based on the angle $B_{II'}OD$ and the angle $C_{II'}OD$; in the present invention, the magnitudes of the angle $B_{II'}OD$ and the angle $A_{II'}C_{II'}B_{II'}$ can be calculated based on the value of $(X_{II'}, Y_{II'})$, and the magnitude of the angle $A_{II'}C_{II'}B_{II'}$ and the value of $Y_{II'}$ are in a relationship of a linear function, the relationship between the magnitude of the angle $B_{II'}OD$ and the value of $X_{II'}$ is $\angle B_{II'}OD = f(X_{II'})$, the f function can be any function that satisfies the following conditions:

$$\theta = f(0)$$

$$180° = f(H)$$

Wherein, H is the height of the isosceles triangle, and the heights of the four isosceles triangular planes II', III', IV' and V' are respectively $$\frac{H_{II'}}{2}, \frac{W_{II'}}{2}, \frac{H_{II'}}{2}, \frac{W_{II'}}{2};$$

(2.2) Calculating the coordinate of $A_{II'}$, "Coordinate'", based on the magnitudes of the angle $B_{II'}OD$ and the angle $A_{II'}C_{II'}B_{II'}$ and the values of $\beta_1$, $\beta_2$ and $\beta_3$;

(2.3) Calculating the coordinate of the intersection of the ray $\overrightarrow{OA_{II'}}$ and the spherical surface, "Coordinate", based on the coordinate of the point $A_{II'}$.

Third step: splicing the four isosceles triangular planes II', III', IV' and V' obtained in the second step into a rectangular plane VI' with a resolution of $W_{II'} \times H_{II'}$.

The rectangular plane I' and rectangular plane VI' are the two-dimensional image or video B obtained by mapping.

For the above-mentioned panoramic video mapping process, further, in (2.1), $f(X_{II'})$ may be:

$$f(X_{II'}) = \theta + (180° - \theta) \times \frac{\tan(X_{II'} \div H \times 180° \times C)}{\tan(180° \times C)}$$

(Wherein, C is a constant that is greater than 0 and less than 0.5).

On the other hand, in the process of the panoramic image inverse mapping method, mapping a two-dimensional image or video B back to a spherical surface based on a main viewpoint. The two-dimensional image or video B includes a rectangular plane I' with a resolution of $W_{I'} \times H_{I'}$, and a rectangular plane VI' with a resolution of $W_{II'} \times H_{II'}$, wherein, the rectangular plane VI' may be further divided into four isosceles triangular planes II', III', IV' and V', and the base edge and the height of the four isosceles triangles are respectively $$W_{II'} \times \frac{H_{II'}}{2}, H_{II'} \times \frac{W_{II'}}{2}, W_{II'} \times \frac{H_{II'}}{2}, H_{II'} \times \frac{W_{II'}}{2}.$$

The inverse mapping method firstly projects the above-mentioned plane onto a quadrangular pyramid by means of such as isometric projection, and then maps the quadrangular pyramid onto a spherical surface. Specifically, a right-handed coordinate system is established based on the sphere center O, wherein the Z axis points to the direction at longitude and latitude of (0°, 0°) of the spherical surface, the Y axis points to the direction of the north pole of the spherical surface, and the X axis points to the direction at longitude and latitude of (90°, 0°) of the spherical surface. Then, a quadrangular pyramid W is established, the center of the bottom plane of the quadrangular pyramid W is on the positive Z axis, the apex is on the negative Z axis, and the base edges are respectively parallel to the X axis and parallel to the Y axis; the connecting line between the center D of the bottom plane of the quadrangular pyramid and the sphere center O is denoted as $l_1$, and the connecting line between the midpoint of a base edge of the quadrangular pyramid and the sphere center O is denoted as $l_2$, and the angle formed by $l_1$ and $l_2$ is θ, and θ represents the size of the main viewpoint region; the bottom plane of the quadrangular pyramid is denoted as plane I'', the side surface intersecting with the positive X axis is denoted as plane II'', the side surface intersecting with the positive Y axis is denoted as plane III'', the side surface intersecting with the negative X axis is denoted as plane IV'', and the side surface intersecting with the negative Y axis is denoted as plane V''. When the pitch angle, the yaw angle and the roll angle of the main viewpoint are respectively $β_1$, $β_2$ and $β_3$, a corresponding quadrangular pyramid Q' is obtained by rotating the quadrangular pyramid Q about the sphere center O by ($β_1$, $β_2$, $β_3$). The sphere center O and the four base edges of the quadrangular pyramid Q' form four sector planes, and the four sector planes divide the spherical surface into two regions. Wherein, one region including the main viewpoint is referred to as the main viewpoint region, and the main viewpoint region corresponds to the bottom plane of the pyramid and is denoted as region I; the other regions are referred to as the non-main viewpoint regions, and the center O and four side edges of the quadrangular pyramid Q' form four sector planes, which further divide one non-main viewpoint region into four sub-regions, and the four sub-regions respectively correspond to the four side surfaces II', III', IV' and V', and are respectively referred to as regions II, III, IV and V. The inverse mapping method of the present invention maps the rectangular plane I' with the resolution of WI'×$H_{I'}$ contained in the two-dimensional image or video B onto the main viewpoint I of the spherical surface, and maps the four isosceles triangular planes II', III', IV' and V' contained in the two-dimensional image or video B onto the non-main viewpoints II, III, IV and V of the spherical surface. The values of the parameters θ, $W_{I'}$, $H_{I'}$, $W_{II'}$, $H_{II'}$, $β_1$, $β_2$ and $β_3$ can be obtained from a bit stream, but is not limited thereto.

For the above-mentioned panoramic image inverse mapping method, further, the method of projecting the planar image or video B back to the spherical surface is to perform the following operations on all points on the spherical surface:

First step: according to the coordinate of the point on the spherical surface, "Coordinate", and the values of $β_1$, $β_2$, and $β_3$, determining which one of the regions I, II, III, IV and V the point is located in; if the point is in region I, go to the second step; if the point is in region II, III, IV, or V, go to the fifth step;

Second step: the point whose spherical coordinate is "Coordinate" is denoted as $A_{I'}$, the connecting lines between the midpoints of the opposite base edges of the quadrangular pyramid Q' are denoted as $m_1$ and $m_2$, and the projections of the point $A_{I'}$ on $m_1$ and $m_2$ are respectively denoted as $B_{I'}$ and $C_{I'}$, and the center of the bottom plane of the quadrangular pyramid Q' is denoted as D; and calculating the magnitudes of the angle $B_{I'}OD$ and the angle $C_{I'}OD$ according to the coordinate of $A_{I'}$, "Coordinate", and the values of $β_1$, $β_2$ and $β_3$;

Third step: calculating the value of the plane coordinate ($X_{I'}$, $Y_{I'}$) according to the magnitudes of the angle $B_{I'}OD$ and the angle $C_{I'}OD$, wherein, the value of $X_{I'}$ and the magnitude of the angle $B_{I'}OD$ are in a relationship of a linear function, and the value of $Y_{I'}$ and the magnitude of the angle $C_{I'}OD$ are in a relationship of a linear function;

Fourth step: using the pixel value (or the pixel value obtained by interpolation based on neighboring pixels) at ($X_{I'}$, $Y_{I'}$) on the rectangular plane I' as the pixel value of the point with the coordinate "Coordinate" on the spherical surface; omit the subsequent steps;

Fifth step: the point whose spherical coordinate is "Coordinate" is denoted as $A_{II'}$, and, the connecting line between the midpoint of the base edge of the side surface and the apex of the quadrangular pyramid Q' is denoted as $n_1$, and the plane passing $n_1$ and the sphere center O is denoted as $α_3$, and the connecting line between the center of the bottom plane and the apex of the quadrangular pyramid Q' is denoted as $n_2$, and the projections of point $A_{II'}$ on $α_3$ and $n_2$ are denoted as $B_{II'}$ and $C_{II'}$, respectively, and the center of the bottom plane of the quadrangular pyramid Q' is denoted as D; calculating the magnitudes of the angle $B_{II'}OD$ and the angle $A_{II'}C_{II'}B_{II'}$ according to the coordinate of $A_{II'}$, "Coordinate", and the values of $β_1$, $β_2$ and $β_3$;

Sixth step: calculating the value of the plane coordinate ($X_{II'}$, $Y_{II'}$) according to the magnitudes of the angle $B_{II'}OD$ and the angle $A_{II'}C_{II'}B_{II'}$ (the X and Y coordinate axes are respectively perpendicular to and parallel to the base of the isosceles triangle), the value of $Y_{II'}$ and the magnitude of the angle $A_{II'}C_{II'}B_{II'}$ are in a relationship of a linear function, and the relationship between the magnitude of the angle $B_{II'}OD$ and the value of $X_{II'}$ is $∠B_{II'}OD=f(X_{II'})$, the f function can be any function that satisfies the following conditions:

$$θ=f(0)$$

$$180°=f(H)$$

Wherein, H is the height of the isosceles triangle, and the heights of the four isosceles triangular planes II', III', IV' and V' are respectively $$\frac{H_{II'}}{2}, \frac{W_{II'}}{2}, \frac{H_{II'}}{2}, \frac{W_{II'}}{2};$$

Seventh step: Using the pixel value (or the pixel value obtained by interpolation based on neighboring pixels) at ($X_{II'}$, $Y_{II'}$) on the triangular plane as the pixel value of the point with the coordinate "Coordinate" on the spherical surface; omit the subsequent steps;

Perform the processes from the first step to the seventh step on all points on the spherical surface, thereby obtaining a panoramic image of the spherical surface.

For the above-mentioned panoramic image inverse mapping method, further, in the sixth step, $f(X_{II'})$ may be:

$$f(X_{II'}) = \theta + (180° - \theta) \times \frac{\tan(X_{II'} \div H \times 180° \times C)}{\tan(180° \times C)}$$

(Wherein, C is a constant that is greater than 0 and less than 0.5).

Compared with the prior art, the beneficial effects of the present invention are as follows:

Disclosed are a panoramic video asymmetrical mapping method and a corresponding inverse mapping method, mapping a spherical surface corresponding to a panoramic image or video A onto a two-dimensional image or video B; projecting the spherical surface onto an isosceles quadrangular pyramid with a square bottom plane, and further projecting the isosceles quadrangular pyramid onto a planar surface; using isometric projection on a main viewpoint region in the projection and using a relatively high sampling density to ensure that the video quality of the region of the main viewpoint is high, while using a relatively low sample density for non-main viewpoint regions so as to reduce bit rate. While ensuring that the video quality of the region of the main viewpoint remains unchanged, the present panoramic video asymmetrical mapping technique greatly reduces the resolution of the remaining regions in the video, effectively reducing the bit rate required for encoding a virtual reality video. The panoramic video asymmetrical inverse mapping technique provides a method for mapping from a planar surface to a spherical surface, and by means of said method, a planar surface video may be mapped back to a spherical surface for rendering and viewing.

The present invention overcomes the shortcomings of the prior art, further improves coding efficiency of the asymmetric mapping technology, and has the following advantages:

(1) In the present invention, in the main viewpoint region, the angles on the spherical surface and the planar coordinates are in a relationship of a linear function, that is, in the main viewpoint region, equidistant sampling is performed according to the angles, so as to ensure that the sampling of the main viewpoint region is uniform;

(2) In the present invention, the parameter θ and the function f of the panoramic image mapping method are both adjustable, that is, the range of the main viewpoint region and the speed variation in the sampling density are both adjustable;

(3) When the parameter θ and the function $f(X_{II})$ are reasonably set, the quality of the main viewpoint region can be guaranteed, and the bit rate can be greatly saved. For example, when θ=45°, $$\angle DOB = f(X_{II'}) = \theta + (180° - \theta) \times \frac{\tan(X_{II'} \div H \times 180° \times 0.35)}{\tan(180° \times 0.35)},$$

a video with a resolution of 4096×2048 will be mapped into a video with a resolution of 1024×1024 in both plane I' and plane VI', and then plane I and plane II are spliced into a video with a resolution of 2048×1024. Compared with the prior asymmetric mapping technology, the coding efficiency can be improved by about 10-30%.

(4) Through the inverse mapping method, a planar image B in the present invention can be mapped back to a spherical surface for rendering and viewing.

Figure 2:
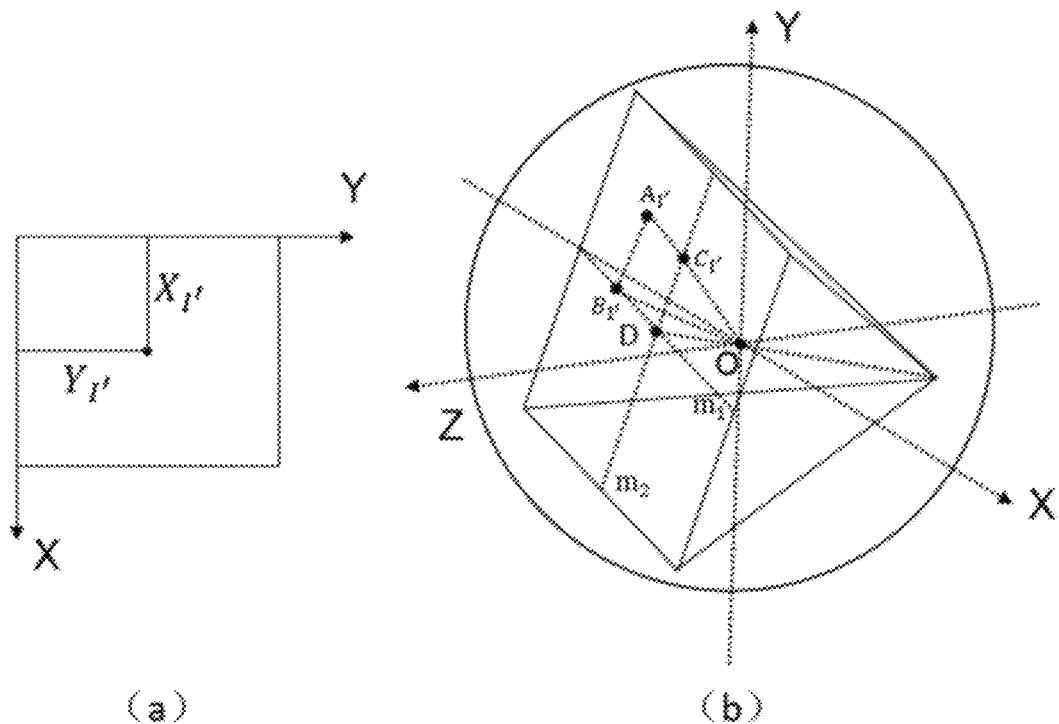

Wherein, a) is a schematic diagram of a corresponding quadrangular pyramid and a spherical surface when the pitch angle, the yaw angle and the roll angle of the main viewpoint are (0°, 0°, 0°), respectively; (b) is a schematic diagram of a corresponding quadrangular pyramid and a spherical surface when the pitch angle, the yaw angle and the roll angle of the main viewpoint are ($\beta_1$, $\beta_2$, $\beta_3$), respectively; c) is a schematic diagram of a rectangular plane I' and a rectangular plane VI' obtained by mapping a spherical surface to a plane by the method of the present invention;

In (a): O is the sphere center; the Z axis points to the direction at longitude and latitude of (0°, 0°) of the spherical surface, the Y axis points to the direction of the north pole of the spherical surface, and the X axis points to the direction at longitude and latitude of (90°, 0°) of the spherical surface; in the quadrangular pyramid, a quadrangular pyramid W is established, wherein, the center of the bottom plane of the quadrangular pyramid W is on the positive Z axis, the apex is on the negative Z axis, and the base edges are respectively parallel to the X axis and parallel to the Y axis; the angle formed by the connecting line between the center D of the bottom plane of the quadrangular pyramid and the sphere center O and the connecting line between the midpoint of a base edge of the quadrangular pyramid and the sphere center O is θ, and θ represents the size of the main viewpoint region;

In (b): the quadrangular pyramid is obtained by rotating the quadrangular pyramid in (a) about the sphere center O by the pitch angle, the yaw angle and the roll angle;

In (c): I' is a rectangular plane; II', III', IV', V' are four isosceles triangular planes, VI' is a rectangular plane VI' stitched by II', III', IV' and V';

FIG. 2 is a schematic diagram of a mapping relationship between a point with coordinate ($X_{I'}$, $Y_{I'}$) in a rectangular plane I' and a point $A_{I'}$ on a quadrangular pyramid in the present invention;

Wherein, (a) is a schematic diagram of a point with coordinate ($X_{I'}$, $Y_{I'}$) in a rectangular plane I'; (b) is a schematic diagram of the point $A_{I'}$ on a quadrangular pyramid; wherein, O is the sphere center, D is the center of the main viewpoint, $m_1$ and $m_2$ are connecting lines between the midpoints of the opposite base edges of the quadrangular pyramid, respectively, point $A_{I'}$ is the corresponding point on the quadrangular pyramid mapped from the point with coordinate ($X_{I'}$, $Y_{I'}$) in the rectangular plane I', $B_{I'}$ and $C_{I'}$ are projections of point $A_{I'}$ on $m_1$ and $m_2$, respectively.

Figure 3:
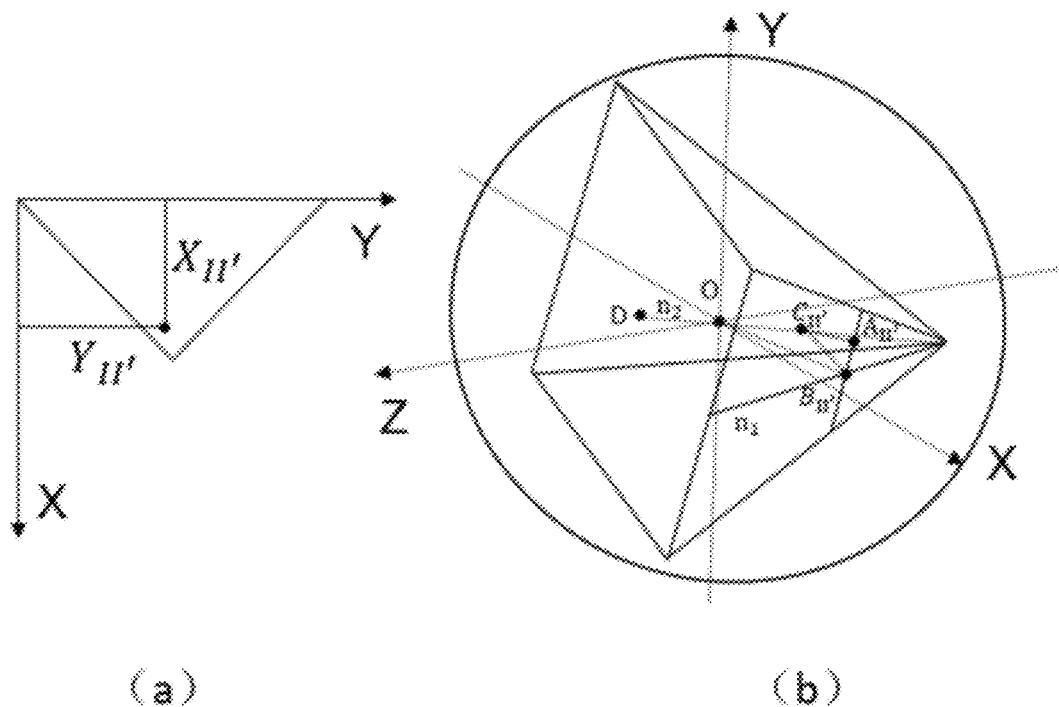

FIG. 3 is a schematic diagram of a mapping relationship between a point with coordinate ($X_{I'}$, $Y_{I'}$) in a triangular plane and a point $A_{II'}$ on a quadrangular pyramid in the present invention;

Wherein, (a) is a schematic diagram of a point with coordinate ($X_{II'}$, $Y_{II'}$) in a triangular plane; (b) is a schematic diagram of the point $A_{II'}$ on a quadrangular pyramid; wherein, O is the sphere center, D is the center of the main viewpoint, $n_1$ is the connecting line between the midpoint of the base edge of the side surface and the apex of the quadrangular pyramidal, $n_2$ is the connecting line between the center D of the bottom plane and the apex of the quadrangular pyramidal, point $A_{II'}$ is the corresponding point on the quadrangular pyramid mapped from the point with coordinate $(X_{II'}, Y_{II'})$ in the triangular plane, $B_{II'}$ and $C_{II'}$ are projections of point $A_{II'}$ on $n_1$ and $n_2$, respectively.

Figure 4:
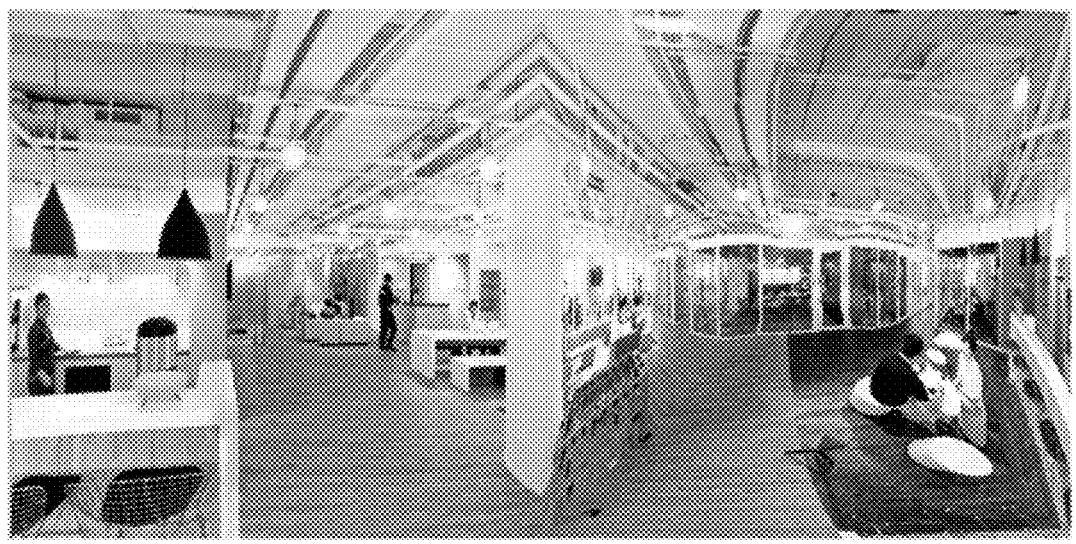

FIG. 4 is an effect diagram of an embodiment of the panoramic image mapping method according to the present invention.

Figure 5:
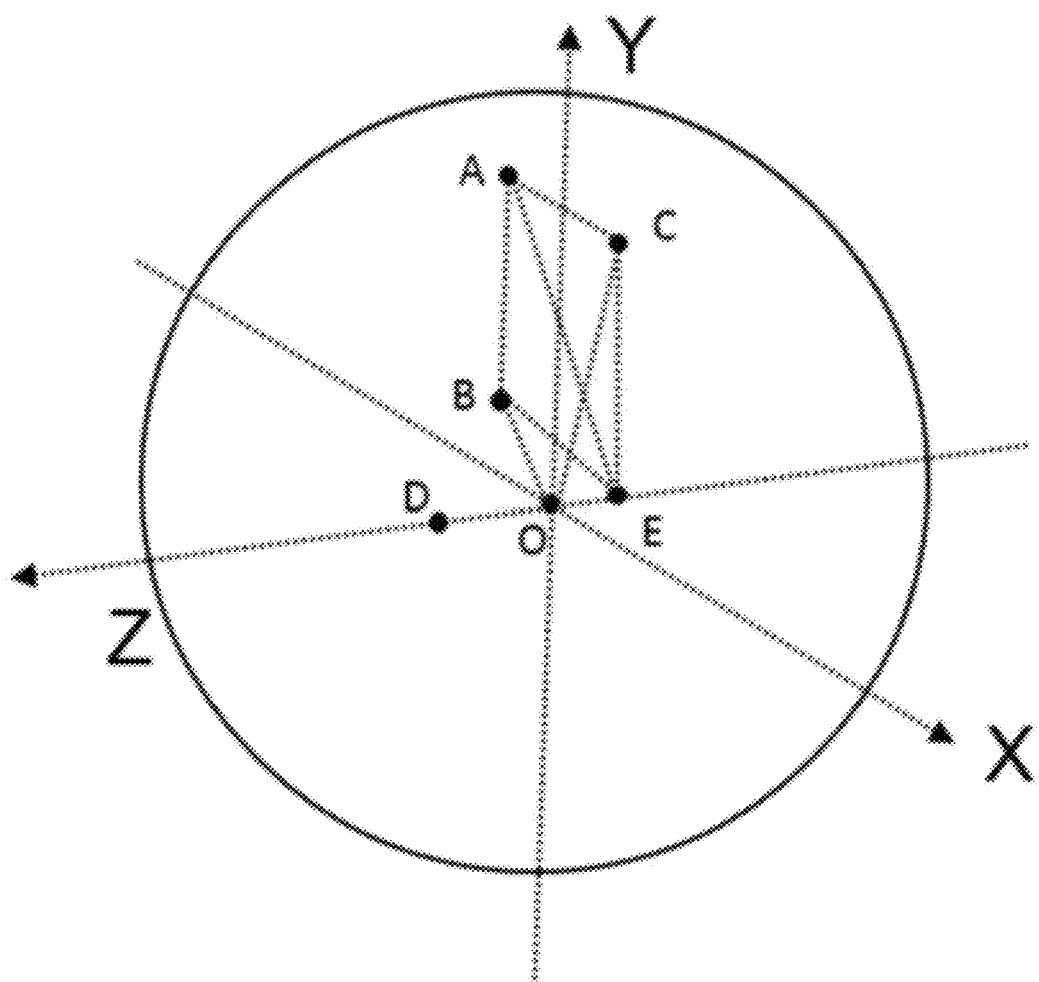

FIG. 5 is a schematic diagram of calculating the angle BOD and the angle COD in the panoramic image inverse mapping method of the present invention;

Wherein, points B and C are projections of point A on the ZOX and ZOY planes, respectively; point D is a point on the positive Z axis, and E is a point on the negative Z axis.

Figure 6:
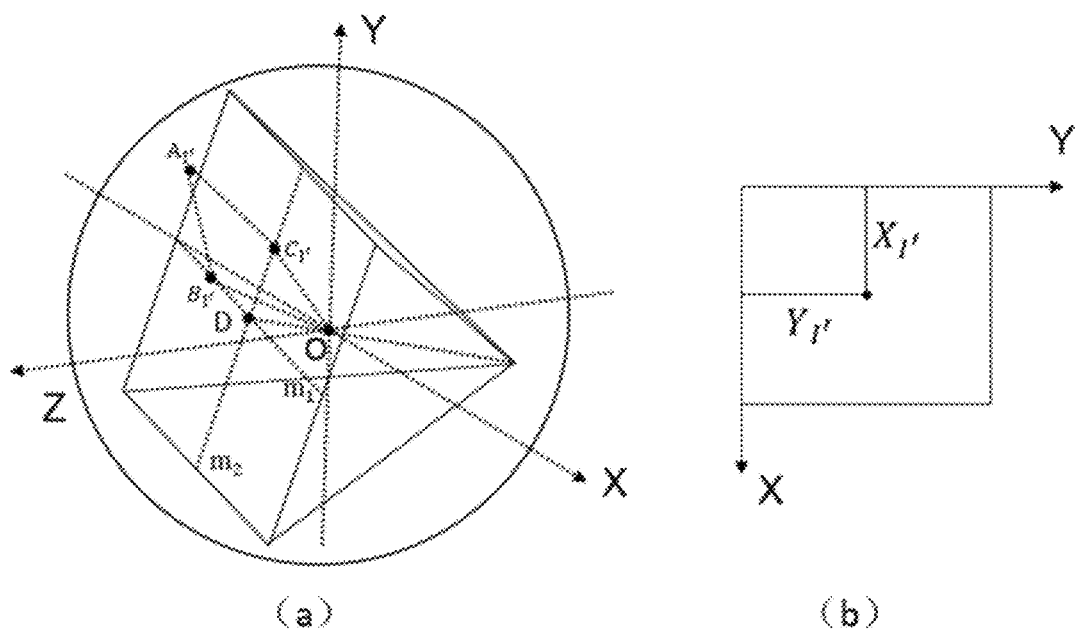

FIG. 6 is a schematic diagram of a mapping relationship between the point $A_{I'}$ located on the spherical surface in region I and a point with coordinate $(X_{I'}, Y_{I'})$ in the rectangular plane I' in the panoramic image inverse mapping method according to the present invention;

Wherein, (a) is a schematic diagram of the point $A_{I'}$ located in the region I on a spherical surface, O is the sphere center, D is the center of the main viewpoint, $m_1$ and $m_2$ are connecting lines between the midpoints of the opposite base edges of the quadrangular pyramid, respectively, $B_{I'}$ and $C_{I'}$ are projections of point $A_{I'}$ on $m_1$ and $m_2$, respectively; (b) is a schematic diagram of a point with coordinate $(X_{I'}, Y_{I'})$ in the rectangular plane I'.

Figure 7:
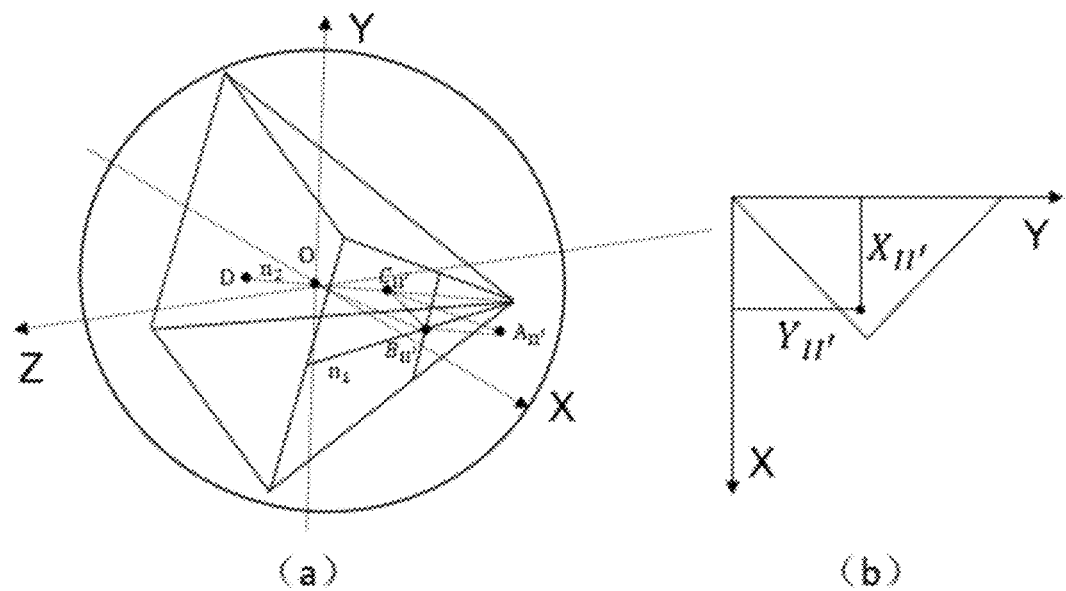

FIG. 7 is a schematic diagram of a mapping relationship between a point $A_{II'}$ in region II, III, IV or V of a spherical surface and a point $(X_{II'}, Y_{II'})$ in a triangular plane in the panoramic image inverse mapping method of the present invention;

Wherein, (a) is a schematic diagram of the point $A_{II'}$ in region II, III, IV or V on the spherical surface, O is the sphere center, D is the center of the main viewpoint, $n_1$ is the connecting line between the midpoint of the base edge of the side surface and the apex of the quadrangular pyramidal, $n_2$ is the connecting line between the center D of the bottom plane and the apex of the quadrangular pyramidal, $B_{II'}$ and $C_{II'}$ are projections of point $A_{II'}$ on $n_1$ and $n_2$, respectively; (b) is a schematic diagram of a point $(X_{II'}, Y_{II'})$ with coordinate $(X_{II'}, Y_{II'})$ in a triangular plane.

DETAILED DESCRIPTION OF EMBODIMENTS

Hereinafter, the present disclosure is further described through the embodiments, but the scope of the present disclosure is not limited in any manner.

Embodiments of the present invention provide a panoramic image mapping method based on a main viewpoint, including a panoramic image mapping method and a corresponding inverse mapping method. Embodiments of the mapping method and the inverse mapping method are described as follows.

Figure 1:
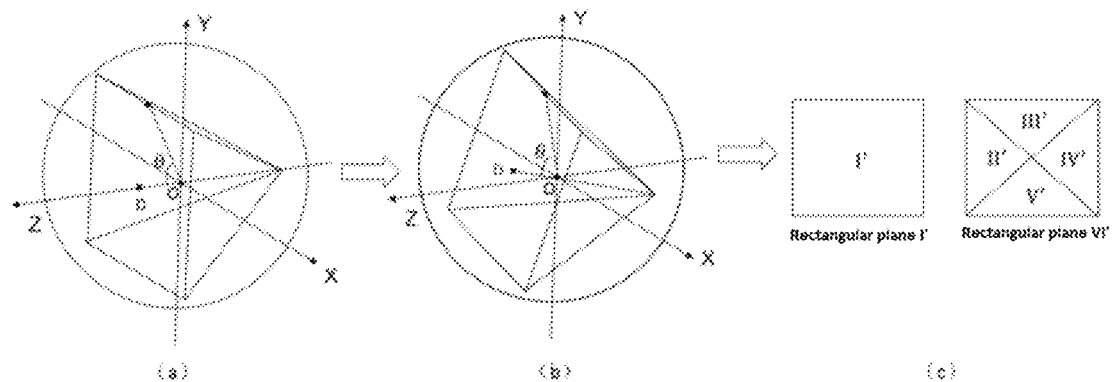
FIG. 1 is a schematic diagram of a mapping relationship between a spherical surface and a plane in a mapping process of the present invention.

In an embodiment of the panoramic image mapping method, a spherical surface corresponding to a panoramic image A of a certain mapping format (such as a latitude and longitude map, a cube map image, etc.) is mapped to a planar image B corresponding to the panoramic mapping designed in the present invention. The planar image B includes a rectangular plane I' with a resolution of $W_{I'} \times H_{I'}$ and a rectangular plane VI' with a resolution of $W_{II'} \times H_{II'}$. The panoramic image mapping method firstly project the spherical surface onto an isosceles quadrangular pyramid with a square bottom plane, and then project the quadrangular pyramid onto a planar surface; in the projection, use isometric projection on a main viewpoint region and use a relatively high sampling density to ensure that the video quality of the region of the main viewpoint is high, while use a relatively low sample density for non-main viewpoint regions so as to reduce bit rate. As shown in FIG. 1, a right-handed coordinate system is established based on the sphere center O, wherein the Z axis points to the direction at longitude and latitude of (0°, 0°) of the spherical surface, the Y axis points to the direction of the north pole of the spherical surface, and the X axis points to the direction at longitude and latitude of (90°, 0°) of the spherical surface. Then, a quadrangular pyramid W is established, wherein, the center of the bottom plane of the quadrangular pyramid W is on the positive Z axis, the apex is on the negative Z axis, and the base edges are respectively parallel to the X axis and parallel to the Y axis; the connecting line between the center D of the bottom plane of the quadrangular pyramid and the sphere center O is denoted as $l_1$, and the connecting line between the midpoint of a base edge of the quadrangular pyramid and the sphere center O is denoted as $l_2$, and the angle formed by $l_1$ and $l_2$ is θ, and θ represents the size of the main viewpoint region; the bottom plane of the quadrangular pyramid is denoted as plane I", the side surface intersecting with the positive X axis is denoted as plane II", the side surface intersecting with the positive Y axis is denoted as plane III", the side surface intersecting with the negative X axis is denoted as plane IV", and the side surface intersecting with the negative Y axis is denoted as plane V". When the pitch angle, the yaw angle and the roll angle of the main viewpoint are respectively $β_1$, $β_2$ and $β_3$, a corresponding quadrangular pyramid Q' is obtained by rotating the quadrangular pyramid Q about the sphere center O by ($β_1$, $β_2$, $β_3$). The sphere center O and the four base edges of the quadrangular pyramid Q' form four sector planes, and the four sector planes divide the spherical surface into two regions. Wherein, one region including the main viewpoint is referred to as the main viewpoint region, and the main viewpoint region corresponds to the bottom plane of the pyramid and is denoted as region I, and the other regions are referred to as the non-main viewpoint regions; the sphere center O and four side edges of the quadrangular pyramid Q' form four sector planes, which further divide one non-main viewpoint region into four sub-regions, and the four sub-regions respectively correspond to the four side surfaces II', III', IV' and V', and are respectively referred to as regions II, III, IV and V. The mapping method of the present invention maps the described region I onto a rectangular plane I' with a resolution of $W_{I'} \times H_{I'}$, and maps the regions II, III, IV and V onto four isosceles triangular planes II', III', IV', and V', wherein the base edge and the height of the four isosceles triangular planes are respectively $$W_{II'} \times \frac{H_{II'}}{2}, H_{II'} \times \frac{W_{II'}}{2}, W_{II'} \times \frac{H_{II'}}{2}, H_{II'} \times \frac{W_{II'}}{2},$$

and then the four isosceles triangular planes are spliced into a rectangular plane VI' with a resolution of $W_{II'} \times H_{II'}$. The parameters θ, $W_{I'}$, $H_{I'}$, $W_{II'}$, $β_1$, $β_2$, and $β_3$ can be set as required. The specific processes of the panoramic image mapping method are as follows:

First step: for each pixel in the rectangular plane I', according to its coordinate $(X_{I'}, Y_{I'})$ in the plane I', calculating its corresponding coordinate "Coordinate'" in the bottom plane of the quadrangular pyramid Q', then further calculating its corresponding coordinate "Coordinate" on the spherical surface according to the perspective projection method, and finally according to the spherical coordinate "Coordinate", taking the pixel value of the corresponding position (or the corresponding pixel value obtained based on neighbor pixels by interpolation) on the spherical surface, as the pixel value of the pixel $(X_{I'}, Y_{I'})$ in the plane I'. The specific steps to calculate the spherical coordinate "Coordinate" according to the plane coordinate $(X_{I'}, Y_{I'})$ are as follows:

(1.1) As shown in FIG. 2, the point $(X_{I'}, Y_{I'})$ in the plane I' corresponds to the point $A_{I'}$ in the bottom plane of the quadrangular pyramid Q', and the connecting lines between the midpoints of the opposite base edges of the quadrangular pyramid Q' are denoted as $m_1$ and $m_2$, and the projections of the point $A_{I'}$ on $m_1$ and $m_2$ are respectively Br and Cr. The angles $B_{I'}OD$ and $C_{I'}OD$ are calculated according to the value of $(X_{I'}, Y_{I'})$, and the calculation formulas are as follows:

$$\angle B_{I'}OD = 2\theta \times \frac{Y_{I'}}{W_{I'}} - \theta$$

$$\angle C_{I'}OD = -2\theta \times \frac{Y_{X'}}{H_{I'}} + \theta$$

(1.2) The coordinate of $A_{I'}$, "Coordinate'", which is expressed by Cartesian coordinates, is determined according to the magnitude of the angle $B_{I'}OD$, the magnitude of the angle $C_{I'}OD$ and the values of $\beta_1$, $\beta_2$ and $\beta_3$, and the calculation formula thereof is:

$$(X_{A_{I'}}, Y_{A_{I'}}, Z_{A_{I'}}) = (k \times \tan(\angle B_{I'}OD), k \times \tan(\angle C_{I'}OD), k) \times T$$
$$= k \times (\tan(\angle B_{I'}OD), \tan(\angle C_{I'}OD), 1) \times T$$

Wherein, T is a 3×3 dimensional rotation matrix generated according to the pitch angle $\beta_1$, the yaw angle $\beta_2$ and the roll angle $\beta_3$; k is the length of the line segment OD;

(1.3) According to the coordinate of the point $A_{I'}$, the coordinate of the intersection of the ray $\overrightarrow{OA_{I'}}$ and the spherical surface, "Coordinate", is obtained, and the coordinate "Coordinate" is represented by the Cartesian coordinates, and the calculation formula thereof is:

$$(X_{sphere}, Y_{sphere}, Z_{sphere}) = R \times \frac{(X_{A_{I'}}, Y_{A_{I'}}, Z_{A_{I'}})}{|X_{A_{I'}}, Y_{A_{I'}}, Z_{A_{I'}}|}$$
$$= R \times \frac{k \times (\tan(\angle B_{I'}OD), \tan(\angle C_{I'}OD), 1) \times T}{k \times |(\tan(\angle B_{I'}OD), \tan(\angle C_{I'}OD), 1) \times T|}$$
$$= R \times \frac{(\tan(\angle B_{I'}OD), \tan(\angle C_{I'}OD), 1) \times T}{|(\tan(\angle B_{I'}OD), \tan(\angle C_{I'}OD), 1) \times T|}$$

Wherein, R is the radius of the sphere;

$$|X_{A_{I'}}, Y_{A_{I'}}, Z_{A_{I'}}|$$

represents the modulus of the line segment $OA_{I'}$, that is, the length of the line segment $OA_{I'}$, and dividing $$(X_{A_{I'}}, Y_{A_{I'}}, Z_{A_{I'}})$$

by $$|X_{A_{I'}}, Y_{A_{I'}}, Z_{A_{I'}}|$$

is a normalization operation on $$(X_{A_{I'}}, Y_{A_{I'}}, Z_{A_{I'}}).$$

It should be noted that the value of k in the above step (1.2) is unknown, but it does not affect the subsequent calculation, because k will be eliminated when the normalization operation is performed on $$(X_{A_{I'}}, Y_{A_{I'}}, Z_{A_{I'}})$$

in step (1.3).

Second step: for each pixel in the four isosceles triangular planes II', III', IV' and V', according to its coordinate $(X_{II'}, Y_{II'})$ (the X and Y coordinate axes are respectively perpendicular to and parallel to the base of the isosceles triangle), calculating its corresponding coordinate "Coordinate'" on the side surface of the quadrangular pyramid Q', then further calculating its corresponding coordinate "Coordinate" on the spherical surface according to the perspective projection method, and finally according to the spherical coordinate "Coordinate", taking the pixel value of the corresponding position (or the corresponding pixel value obtained based on neighbor pixels by interpolation) on the spherical surface, as the pixel value of the pixel $(X_{II'}, Y_{II'})$. The specific steps to calculate the spherical coordinate "Coordinate" according to the plane coordinate $(X_{II'}, Y_{II'})$ are as follows:

(2.1) As shown in FIG. 3, the pixel $(X_{II'}, Y_{II'})$ corresponds to the point $A_{II'}$ on the side surface of the quadrangular pyramid Q', the connecting line between the midpoint of the base edge of the side surface and the apex of the quadrangular pyramid Q' is denoted as $n_1$, and the connecting line between the center of the bottom plane and the apex of the quadrangular pyramid Q' is denoted as $n_2$, and the projections of point $A_{II'}$ on $n_1$ and $n_2$ are denoted as $B_{II'}$ and $C_{II'}$, respectively. The magnitude of the angle $B_{II'}OD$ and the angle $A_{II'}C_{II'}B_{II'}$ are calculated according to the value of $(X_{II'}, Y_{II'})$, and the calculation formulas are as follows:

$$\angle B_{II'}OD = f(X_{II'})$$

$$\angle A_{II'}C_{II'}B_{II'} = \left(Y_{II'} - \frac{L}{2}\right) \div \left(\frac{H - X_{II'}}{H} \times L\right) \times 90°$$

Wherein, the f function can be any function that satisfies the following conditions:

$\theta = f(0)$ $180° = f(H)$

Wherein, H is the height of the isosceles triangle, and the heights of the four isosceles triangular planes II', III', IV' and V' are respectively $$\frac{H_{II'}}{2}, \frac{W_{II'}}{2}, \frac{H_{II'}}{2}, \frac{W_{II'}}{2};$$

L is the base of an isosceles triangle, and the heights of the four isosceles triangular planes II', III', IV' and V' are respectively $W_{II'}$, $W_{II'}$ and $H_{II'}$;

(2.2) The coordinate of $A_{II'}$, "Coordinate'", which is expressed by Cartesian coordinates, is determined according to the magnitude of the angle $B_{II'}OD$, the magnitude of the angle $A_{II'}C_{II'}B_{II'}$ and the values of $\beta_1$, $\beta_2$ and $\beta_3$, and the calculation formula thereof is:

$$\begin{cases} (X_{A_{II'}}, Y_{A_{II'}}, Z_{A_{II'}}) = k \times (1, \tan(\angle A_{II'}C_{II'}B_{II'}), \cot(\angle B_{II'}OD)) \times T & \text{Isosceles triangle } II' \\ (X_{A_{II'}}, Y_{A_{II'}}, Z_{A_{II'}}) = k \times (\tan(\angle A_{II'}C_{II'}B_{II'}), 1, \cot(\angle B_{II'}OD)) \times T & \text{Isosceles triangle } III' \\ (X_{A_{II'}}, Y_{A_{II'}}, Z_{A_{II'}}) = k \times (-1, -\tan(\angle A_{II'}C_{II'}B_{II'}), \cot(\angle B_{II'}OD)) \times T & \text{Isosceles triangle } IV' \\ (X_{A_{II'}}, Y_{A_{II'}}, Z_{A_{II'}}) = k \times (-\tan(\angle A_{II'}C_{II'}B_{II'}), -1, \cot(\angle B_{II'}OD)) \times T & \text{Isosceles triangle } V' \end{cases}$$

Wherein, T is a 3×3 dimensional rotation matrix generated according to the pitch angle $\beta_1$, the yaw angle $\beta_2$ and the roll angle $\beta_3$; k is the length of the line segment $C_{II'}B_{II'}$;

(2.3) According to the coordinate of the point $A_{II'}$, the coordinate of the intersection of the ray $\overrightarrow{OA_{II'}}$ and the spherical surface, "Coordinate", is obtained, and the coordinate "Coordinate" is represented by the Cartesian coordinates, and the calculation formula thereof is:

$$(X_{sphere}, Y_{sphere}, Z_{sphere}) = R \times \frac{(X_{A_{II'}}, Y_{A_{II'}}, Z_{A_{II'}})}{|X_{A_{II'}}, Y_{A_{II'}}, Z_{A_{II'}}|}$$

Wherein, R is the radius of the sphere;

$$|X_{A_{I'}}, Y_{A_{I'}}, Z_{A_{I'}}|$$

represents the modulus of the line segment $OA_{I'}$, that is, the length of the line segment $OA_{I'}$, and dividing $$(X_{A_{I'}}, Y_{A_{I'}}, Z_{A_{I'}})$$

by $$|X_{A_{I'}}, Y_{A_{I'}}, Z_{A_{I'}}|$$

is a normalization operation on $$(X_{A_{I'}}, Y_{A_{I'}}, Z_{A_{I'}}).$$

It should be noted that the value of k in the above step (2.2) is unknown, but it does not affect the subsequent calculation, because k will be eliminated when the normalization operation is performed on $$(X_{A_{I'}}, Y_{A_{I'}}, Z_{A_{I'}})$$

in step (2.3).

Third step: splicing the four isosceles triangular planes II', III', IV' and V' obtained in the second step into a rectangular plane VI' with a resolution of $W_{II'} \times H_{II'}$;

So far, all the steps of the embodiment of the panoramic image mapping method are completed, and the effect of the embodiment is as shown in FIG. 4.

On the other hand, in an embodiment of the panoramic image inverse mapping method, mapping a two-dimensional image or video B back to a spherical surface based on a main viewpoint. The two-dimensional image or video B includes a rectangular plane I' with a resolution of $W_{I'} \times H_{I'}$ and a rectangular plane VI' with a resolution of $W_{II'} \times B_{II'}$, wherein, the rectangular plane VI' may be further divided into four isosceles triangular planes II', III', IV' and V', and the base edge and the height of the four isosceles triangles are respectively $$W_{II'} \times \frac{H_{II'}}{2}, H_{II'} \times \frac{W_{II'}}{2}, W_{II'} \times \frac{H_{II'}}{2}, H_{II'} \times \frac{W_{II'}}{2}.$$

The inverse mapping method firstly projects the above-mentioned plane onto a quadrangular pyramid by means of such as isometric projection, and then maps the quadrangular pyramid onto a spherical surface. Specifically, a right-handed coordinate system is established based on the sphere center O, wherein the Z axis points to the direction at longitude and latitude of (0°, 0°) of the spherical surface, the Y axis points to the direction of the north pole of the spherical surface, and the X axis points to the direction at longitude and latitude of (90°, 0°) of the spherical surface. Then, a quadrangular pyramid W is established, the center of the bottom plane of the quadrangular pyramid W is on the positive Z axis, the apex is on the negative Z axis, and the base edges are respectively parallel to the X axis and parallel to the Y axis; the connecting line between the center D of the bottom plane of the quadrangular pyramid and the sphere center O is denoted as $l_1$, and the connecting line between the midpoint of a base edge of the quadrangular pyramid and the sphere center O is denoted as $l_2$, and the angle formed by $l_1$ and $l_2$ is θ, and θ represents the size of the main viewpoint region; the bottom plane of the quadrangular pyramid is denoted as plane I'', the side surface intersecting with the positive X axis is denoted as plane II'', the side surface intersecting with the positive Y axis is denoted as plane III'', the side surface intersecting with the negative X axis is denoted as plane IV''', and the side surface intersecting with the negative Y axis is denoted as plane V'''. When the pitch angle, the yaw angle and the roll angle of the main viewpoint are respectively $\beta_1$, $\beta_2$ and $\beta_3$, a corresponding quadrangular pyramid Q' is obtained by rotating the quadrangular pyramid Q about the sphere center O by ($\beta_1$, $\beta_2$, $\beta_3$). The sphere center O and the four base edges of the quadrangular pyramid Q' form four sector planes, and the four sector planes divide the spherical surface into two regions. Wherein, one region including the main viewpoint is referred to as the main viewpoint region, and the main viewpoint region corresponds to the bottom plane of the pyramid and is denoted as region I; the other regions are referred to as the non-main viewpoint regions, and the center O and four side edges of the quadrangular pyramid Q' form four sector planes, which further divide one non-main viewpoint region into four sub-regions, and the four sub-regions respectively correspond to the four side surfaces II', III', IV' and V', and are respectively referred to as regions II, III, IV and V. The inverse mapping method of the present invention maps the rectangular plane I' with the resolution of $W_I \times H_I$ contained in the two-dimensional image or video B onto the main viewpoint I of the spherical surface, and maps the four isosceles triangular planes II', III', IV' and V' contained in the two-dimensional image or video B onto the non-main viewpoints II, III, IV and V of the spherical surface. The values of the parameters $\theta$, $W_I$, $H_I$, $W_{II}$, $H_{II}$, $\beta_1$, $\beta_2$ and $\beta_3$ can be obtained from a bit stream, but is not limited thereto. The specific processes of the panoramic image inverse mapping method are as follows:

First step: according to the coordinate of the point on the spherical surface, "Coordinate", and the values of $\beta_1$, $\beta_2$, and $\beta_3$, determining which one of the regions I, II, III, IV and V the point is located in; the specific determination method is:

Firstly, the coordinate of the point on the sphere, "Coordinate", is rotated according to $\beta_1$, $\beta_2$ and $\beta_3$, wherein the coordinate "Coordinate" is expressed by Cartesian coordinates as $(X_{sphere}, Y_{sphere}, Z_{sphere})$, and the point after rotation is referred to as A, and the coordinate of A is:

$$(X_A, Y_A, Z_A) = (X_{sphere}, Y_{sphere}, Z_{sphere}) \times T'$$

Wherein, T' is a 3×3 dimensional rotation matrix generated according to a pitch angle $-\beta_1$, a yaw angle $-\beta_2$ and a roll angle $-\beta_3$;

As shown in FIG. 5, the point A is projected onto the ZOX plane and the ZOY plane, the projection points are point B and point C respectively, and the magnitudes of the angle BOD and the angle COD are calculated:

$$\angle COD = \arctan(Y_A, Z_A)$$

$$\angle BOD = \arctan(X_A, Z_A)$$

Determine the region where the point is located according to the angle BOD and the angle COD:

$$\begin{cases} \text{if} & -\theta < \angle COD < \theta \,\&\&\, -\theta < \angle BOD < \theta & \text{belongs to region } I \\ \text{if} & -\theta < \angle COD < \theta \,\&\&\, \angle BOD = \theta & \text{belongs to region } I \text{ or } II \\ \text{if} & -\theta < \angle COD < \theta \,\&\&\, \angle BOD = -\theta & \text{belongs to region } I \text{ or } VI \\ \text{if} & \angle COD = \theta \,\&\&\, -\theta < \angle BOD < \theta & \text{belongs to region } I \text{ or } III \\ \text{if} & \angle COD = -\theta \,\&\&\, -\theta < \angle BOD < \theta & \text{belongs to region } I \text{ or } V \end{cases}$$

If not, the point is in region II, III, IV or V, and it need to be further determined according to the values of $X_A$ and $Y_A$:

$$\begin{cases} X_A > Y_A > -X_A & \text{belongs to region } II \\ Y_A > X_A > -Y_A & \text{belongs to region } III \\ -X_A > Y_A > -X_A & \text{belongs to region } IV \\ -Y_A > X_A > Y_A & \text{belongs to region } V \\ X_A = Y_A \,\&\&\, X_A > -Y_A & \text{belongs to region } II \text{ or } III \\ X_A = -Y_A \,\&\&\, X_A < Y_A & \text{belongs to region } III \text{ or } IV \\ X_A = Y_A \,\&\&\, X_A < -Y_A & \text{belongs to region } IV \text{ or } V \\ X_A = -Y_A \,\&\&\, X_A > Y_A & \text{belongs to region } II \text{ or } V \end{cases}$$

If the point is in region I, go to the second step; if the point is in region II, III, IV, or V, go to the fifth step;

Second step: as shown in FIG. 6, the point whose spherical coordinate is "Coordinate" is denoted as $A_I$, and the coordinate "Coordinate" is denoted as $(X_{sphere}, Y_{sphere}, Z_{sphere})$ by the Cartesian coordinates. The connecting lines between the midpoints of the opposite base edges of the quadrangular pyramid Q' are denoted as $m_1$ and $m_2$, and the projections of the point $A_I$ on $m_1$ and $m_2$ are respectively denoted as $B_I$ and $C_I$, and the center of the bottom plane of the quadrangular pyramid Q' is denoted as D. Calculate the magnitudes of the angle $B_I OD$ and the angle $C_I OD$ according to the coordinate of $A_I$, "Coordinate", and the values of $\beta_1$, $\beta_2$ and $\beta_3$:

$$(X'_{A_{I'}}, Y'_{A_{I'}}, Z'_{A_{I'}}) = (X_{sphere}, Y_{sphere}, Z_{sphere}) \times T'$$

$$\angle C_{I'} OD = \arctan(Y'_{A_{I'}}, Z'_{A_{I'}})$$

$$\angle B_{I'} OD = \arctan(X'_{A_{I'}}, Z'_{A_{I'}})$$

Wherein, T' is a 3×3 dimensional rotation matrix generated according to the pitch angle $-\beta_1$, the yaw angle $-\beta_2$ and the roll angle $\beta_3$;

The calculation of the angle $B_I OD$ and the angle $C_I OD$ is the same as the calculation method of the angle BOD and the angle COD in the first step, therefore, the values of the angle BOD and the angle COD in the first step can also be directly used as the values of the angle $B_I OD$ and the angle $C_I OD$;

Third step: calculate the value of the plane coordinate $(X_{I'}, Y_{I'})$ according to the magnitudes of the angle $B_I OD$ and the angle $C_I OD$. The calculation formulas are as follows:

$$X_{I'} = \frac{\angle C_{I'} OD - \theta}{-2\theta} \times H_{I'}$$

$$Y_{I'} = \frac{\angle B_{I'} OD + \theta}{2\theta} \times W_{I'}$$

Fourth step: Use the pixel value at $(X_{I'}, Y_{I'})$ on the rectangular plane I' (or the pixel value obtained by interpolation based on neighboring pixels) as the pixel value whose coordinate is "Coordinate" on the spherical surface; omit the subsequent steps;

Fifth step: as shown in FIG. 7, the point, whose spherical coordinate is "Coordinate", is denoted as $A_{II}$, and the coordinate "Coordinate" is denoted as $(X_{sphere}, Y_{sphere}, Z_{sphere})$ by the Cartesian coordinates. The connecting line between the midpoint of the base edge of the side surface and the apex of the quadrangular pyramid Q' is denoted as $n_1$, and the plane passing $n_1$ and the sphere center O is denoted as $\alpha_3$, and the connecting line between the center of the bottom plane and the apex of the quadrangular pyramid Q' is denoted as $n_2$, and the projections of point $A_{II'}$ on $\alpha_3$ and $n_2$ are denoted as $B_{II'}$ and $C_{II'}$, respectively, and the center of the bottom plane of the quadrangular pyramid Q' is denoted as D. Calculate the magnitudes of the angle $B_{II'}OD$ and the angle $A_{II'}C_{II'}B_{II'}$ according to the coordinate of $A_{II'}$, "Coordinate", and the values of $\beta_1$, $\beta_2$ and $\beta_3$;

$$(X'_{A_{II'}}, Y'_{A_{II'}}, Z'_{A_{II'}}) = (X_{sphere}, Y_{sphere}, Z_{sphere}) \times T'$$

Wherein, T' is a 3×3 dimensional rotation matrix generated according to the pitch angle $-\beta_1$, the yaw angle $-\beta_2$ and the roll angle $-\beta_3$;

$$\begin{cases} \angle A_{II'}C_{II'}B_{II'} = \arctan(Y_{A_{II'}}, X_{A_{II'}}), \\ \angle B_{II'}OD = \arctan(X_{A_{II'}}, Z_{A_{II'}}) \end{cases} \text{belongs to region I}$$

$$\begin{cases} \angle A_{II'}C_{II'}B_{II'} = \arctan(X_{A_{II'}}, Y_{A_{II'}}), \\ \angle B_{II'}OD = \arctan(Y_{A_{II'}}, Z_{A_{II'}}) \end{cases} \text{belongs to region III}$$

$$\begin{cases} \angle A_{II'}C_{II'}B_{II'} = \arctan(Y_{A_{II'}}, X_{A_{II'}}), \\ \angle B_{II'}OD = \arctan(-X_{A_{II'}}, Z_{A_{II'}}) \end{cases} \text{belongs to region IV}$$

$$\begin{cases} \angle A_{II'}C_{II'}B_{II'} = \arctan(X_{A_{II'}}, Y_{A_{II'}}), \\ \angle B_{II'}OD = \arctan(-Y_{A_{II'}}, Z_{A_{II'}}) \end{cases} \text{belongs to region V}$$

Sixth step: calculate the value of the plane coordinate ($X_{II'}$, $Y_{II'}$) according to the magnitudes of the angle $B_{II'}OD$ and the angle $A_{II'}C_{II'}B_{II'}$ (the X and Y coordinate axes are respectively perpendicular to and parallel to the base of the isosceles triangle), The relationship between the value of $Y_{II'}$ and the magnitude of the angle $A_{II'}C_{II'}B_{II'}$ is:

$$Y_{II'} = \angle A_{II'}C_{II'}B_{II'} \div 90° \times \left(\frac{H - X_{II'}}{H} \times L\right) + \frac{L}{2}$$

The relationship between the magnitude of the angle $B_{II'}OD$ and the value of $X_{II'}$ is $\angle B_{II'}OD = f(X_{II'})$, and the f function can be any function that satisfies the following conditions:

$$\theta = f(0)$$

$$180° = f(H)$$

Wherein, H is the height of the isosceles triangle, and the heights of the four isosceles triangular planes II', III', IV' and V' are respectively $$\frac{H_{II'}}{2}, \frac{W_{II'}}{2}, \frac{H_{II'}}{2}, \frac{W_{II'}}{2};$$

Seventh step: Use the pixel value at ($X_{II'}$, $Y_{II'}$) on the triangular plane (or the pixel value obtained by interpolation based on neighboring pixels) as the pixel value of the point with the coordinate "Coordinate" on the spherical surface; omit the subsequent steps;

So far, all the steps of the embodiment of the panoramic image inverse mapping method are completed.

It needs to be noted that the embodiments as disclosed are intended to facilitating further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. A main viewpoint-based panoramic video mapping method, mapping a spherical surface corresponding to a panoramic image or video A onto a two-dimensional image or video B; projecting the spherical surface onto an isosceles quadrangular pyramid with a square bottom plane, and further projecting the isosceles quadrangular pyramid onto a planar surface; using isometric projection on a main viewpoint region in the projection and using a relatively high sampling density to ensure that the video quality of the region of the main viewpoint is high, while using a relatively low sample density for non-main viewpoint regions so as to reduce bit rate, wherein, the panoramic video mapping method comprising:

firstly, a right-handed coordinate system is established based on the sphere center O, wherein the Z axis points to the direction at longitude and latitude of (0°, 0°) of the spherical surface, the Y axis points to the direction of the north pole of the spherical surface, and the X axis points to the direction at longitude and latitude of (90°, 0°) of the spherical surface;

then, a quadrangular pyramid W is established, wherein, the center of the bottom plane of the quadrangular pyramid W is on the positive Z axis, the apex is on the negative Z axis, and the base edges are respectively parallel to the X axis and parallel to the Y axis, and, the connecting line between a center D of the bottom plane of the quadrangular pyramid and the sphere center O is denoted as $l_1$, and the connecting line between the midpoint of a base edge of the quadrangular pyramid and the sphere center O is denoted as $l_2$, and the angle formed by $l_1$ and $l_2$ is $\theta$, and $\theta$ represents the size of the main viewpoint region;

the bottom plane of the quadrangular pyramid is denoted as plane I", the side surface intersecting with the positive X axis is denoted as plane II", the side surface intersecting with the positive Y axis is denoted as plane III", the side surface intersecting with the negative X axis is denoted as plane IV", and the side surface intersecting with the negative Y axis is denoted as plane V"; when a pitch angle, a yaw angle and a roll angle of the main viewpoint are respectively $\beta_1$, $\beta_2$ and $\beta_3$, a corresponding quadrangular pyramid Q' is obtained by rotating the quadrangular pyramid Q about the sphere center O by ($\beta_1$, $\beta_2$, $\beta_3$);

the sphere center O and the four base edges of the quadrangular pyramid Q' form four sector planes, which divide the spherical surface into two regions, wherein, one region including the main viewpoint is referred to as the main viewpoint region, which corresponds to the bottom plane of the pyramid and is denoted as region I, and the other regions are referred to as the non-main viewpoint regions;

the sphere center O and four side edges of the quadrangular pyramid Q' form four sector planes, which further divide one non-main viewpoint region into four subregions, which respectively correspond to the four side surfaces II', III', IV' and V', and are respectively referred to as regions II, III, IV and V;

projecting the region I onto a rectangular plane I' with a resolution of $W_{I'} \times H_{I'}$, and projecting the regions II, III, IV and V onto four isosceles triangular planes II', III', IV', and V', wherein the base edge and the height of the four isosceles triangular planes are respectively $$W_{II'} \times \frac{H_{II'}}{2}, H_{II'} \times \frac{W_{II'}}{2}, W_{II'} \times \frac{H_{II'}}{2}, H_{II'} \times \frac{W_{II'}}{2};$$

and then the four isosceles triangular planes are spliced into a rectangular plane VI' with a resolution of $W_{II'} \times H_{II'}$;

the rectangular plane I' and the rectangular plane VI' are the two-dimensional image or video B obtained by mapping;

the parameters $\theta$, $W_{I'}$, $H_{I'}$, $W_{II'}$, $H_{II'}$, $\beta_1$, $\beta_2$, and $\beta_3$ can be set.

2. The panoramic video mapping method of claim 1, wherein, the panoramic video mapping method comprises the following steps:

first step: for each pixel in the rectangular plane I', according to its coordinate $(X_{I'}, Y_{I'})$ in the plane I', calculating its corresponding coordinate "Coordinate'" in the bottom plane of the quadrangular pyramid Q', then further calculating its corresponding coordinate "Coordinate" on the spherical surface according to the perspective projection method, and finally according to the spherical coordinate "Coordinate", taking a pixel value of the corresponding position or a corresponding pixel value obtained based on neighbor pixels by interpolation on the spherical surface, as the pixel value of the pixel $(X_{I'}, Y_{I'})$ in the plane I';

second step: for each pixel in the four isosceles triangular planes II', III', IV' and V', according to its coordinate $(X_{II'}, Y_{II'})$, calculating its corresponding coordinate "Coordinate'" on the side surface of the quadrangular pyramid Q', then further calculating its corresponding coordinate "Coordinate" on the spherical surface according to the perspective projection method, and finally according to the spherical coordinate "Coordinate", taking the pixel value of the corresponding position or the corresponding pixel value obtained based on neighbor pixels by interpolation on the spherical surface, as the pixel value of the pixel $(X_{II'}, Y_{II'})$;

third step: splicing the four isosceles triangular planes II', III', IV' and V' obtained in the second step into a rectangular plane VI' with a resolution of $W_{II'} \times H_{II'}$.

3. The panoramic video mapping method of claim 2, wherein, in the first step, calculating the spherical coordinate "Coordinate" according to the plane coordinate $(X_{I'}, Y_{I'})$ comprises the following steps:

(1.1) the point, corresponding to the point in the plane I' with the coordinate $(X_{I'}, Y_{I'})$, in the bottom plane of the quadrangular pyramid Q' is denoted as $A_{I'}$, and the connecting lines between the midpoints of the opposite base edges of the quadrangular pyramid Q' are denoted as $m_1$ and $m_2$, the projections of the point $A_{I'}$ on $m_1$ and $m_2$ are respectively denoted as $B_{I'}$ and $C_{I'}$, and the center of the bottom plane of the quadrangular pyramid Q' is denoted as D, and the position of $A_{I'}$ can be determined based on the angle $B_{I'}OD$ and the angle $C_{I'}OD$; a magnitude of the angle $B_{I'}OD$ and a magnitude of the angle $C_{I'}OD$ can be calculated based on the value of $(X_{I'}, Y_{I'})$, and, the magnitude of the angle $B_{I'}OD$ and the value of $X_{I'}$ are in a relationship of a linear function, and the magnitude of the angle $C_{I'}OD$ and the value of $Y_{I'}$ are in a relationship of a linear function;

(1.2) the coordinate of $A_{I'}$, "Coordinate'", is determined according to the magnitude of the angle $B_{I'}OD$, the magnitude of the angle $C_{I'}OD$ and the values of $\beta_1$, $\beta_2$ and $\beta_3$;

(1.3) the coordinate of the intersection of the ray $\overrightarrow{OA_{I'}}$ and the spherical surface, "Coordinate", is obtained according to the coordinate of the point $A_{I'}$.

4. The panoramic video mapping method of claim 2, wherein, in the second step, calculating the spherical coordinate "Coordinate" according to the plane coordinate $(X_{II'}, Y_{II'})$ comprises the following steps:

(2.1) the point, corresponding to the pixel $(X_{II'}, Y_{II'})$, on the side surface of the quadrangular pyramid Q' is denoted as $A_{II'}$, the connecting line between the midpoint of the base edge of the side surface and the apex of the quadrangular pyramid Q' is denoted as $n_1$, and the connecting line between the center of the bottom plane and the apex of the quadrangular pyramid Q' is denoted as $n_2$, and the projections of point $A_{II'}$ on $n_1$ and $n_2$ are denoted as $B_{II'}$ and $C_{II'}$, respectively, and the center of the bottom plane of the quadrangular pyramid Q' is denoted as D, and the position of $A_{II'}$ can be determined based on the angle $B_{I'}OD$ and the angle $C_{I'}OD$; a magnitudes of the angle $B_{II'}OD$ and a magnitude of the angle $A_{II'}C_{II'}B_{II'}$ can be calculated based on the value of $(X_{II'}, Y_{II'})$, and, the magnitude of the angle $A_{II'}C_{II'}B_{II'}$ and the value of $Y_{II'}$ are in a relationship of a linear function, and the relationship between the magnitude of the angle $B_{II'}OD$ and the value of $X_{II'}$ is $\angle B_{II'}OD = f(X_{II'})$, wherein the f function can be any function that satisfies the following conditions:

$$\theta = f(0)$$

$$180° = f(H)$$

wherein, H is the height of the isosceles triangle, and the heights of the four isosceles triangular planes II', III', IV' and V' are respectively $$\frac{H_{II'}}{2}, \frac{W_{II'}}{2}, \frac{H_{II'}}{2}, \frac{W_{II'}}{2};$$

(2.2) calculating the coordinate of $A_{II'}$, "Coordinate'", based on the magnitudes of the angle $B_{II'}OD$ and the angle $A_{II'}C_{II'}B_{II'}$ and the values of $\beta_1$, $\beta_2$ and $\beta_3$;

(2.3) calculating the coordinate of the intersection of the ray $\overrightarrow{OA_{II'}}$ and the spherical surface, "Coordinate", based on the coordinate of the point $A_{II'}$.

5. The panoramic video mapping method of claim 4, wherein, in (2.1), $f(X_{II'})$ is:

$$f(X_{II'}) = \theta + (180° - \theta) \times \frac{\tan(X_{II'} \div H \times 180° \times C)}{\tan(180° \times C)}$$

wherein, C is a constant that is greater than 0 and less than 0.5.

6. The panoramic video mapping method of claim 1, wherein, the mapping formats of panoramic image A comprises a longitude and latitude image, a cube-mapped image, or a panoramic video captured by a multi-channel camera.

7. A main viewpoint-based panoramic video inverse mapping method, mapping a two-dimensional image or video B back to a spherical surface based on a main viewpoint; the two-dimensional image or video B includes a rectangular plane I' with a resolution of $W_{I'} \times H_{I'}$, and a rectangular plane VI' with a resolution of $W_{II'} \times H_{II'}$, wherein, the rectangular plane VI' is further divided into four isosceles triangular planes II', III', IV' and V', and the base edge and the height of the four isosceles triangles are respectively $$W_{II'} \times \frac{H_{II'}}{2}, H_{II'} \times \frac{W_{II'}}{2}, W_{II'} \times \frac{H_{II'}}{2}, H_{II'} \times \frac{W_{II'}}{2};$$

the inverse mapping method firstly projects the above-mentioned plane onto a quadrangular pyramid by means of isometric projection, and then projects the quadrangular pyramid onto a spherical surface; comprising:

a right-handed coordinate system is established based on the sphere center O, wherein the Z axis points to the direction at longitude and latitude of (0°, 0°) of the spherical surface, the Y axis points to the direction of the north pole of the spherical surface, and the X axis points to the direction at longitude and latitude of (90°, 0°) of the spherical surface;

a quadrangular pyramid W is established, wherein, the center of the bottom plane of the quadrangular pyramid W is on the positive Z axis, the apex is on the negative Z axis, and the base edges are respectively parallel to the X axis and parallel to the Y axis, and, the connecting line between a center D of the bottom plane of the quadrangular pyramid and the sphere center O is denoted as $l_1$, and the connecting line between the midpoint of a base edge of the quadrangular pyramid and the sphere center O is denoted as $l_2$, and the angle formed by $l_1$ and $l_2$ is θ, and θ represents the size of the main viewpoint region, and, the bottom plane of the quadrangular pyramid is denoted as plane I'', the side surface intersecting with the positive X axis is denoted as plane II'', the side surface intersecting with the positive Y axis is denoted as plane III'', the side surface intersecting with the negative X axis is denoted as plane IV'', and the side surface intersecting with the negative Y axis is denoted as plane V'';

when a pitch angle, a yaw angle and a roll angle of the main viewpoint are respectively $β_1$, $β_2$ and $β_3$, a corresponding quadrangular pyramid Q' is obtained by rotating the quadrangular pyramid Q about the sphere center O by ($β_1$, $β_2$, $β_3$), and, the sphere center O and the four base edges of the quadrangular pyramid Q' form four sector planes, which divide the spherical surface into two regions, wherein, one region including the main viewpoint is referred to as the main viewpoint region, which corresponds to the bottom plane of the pyramid and is denoted as region I, and the other regions are referred to as the non-main viewpoint regions;

the center O and four side edges of the quadrangular pyramid Q' form four sector planes, which further divide one non-main viewpoint region into four sub-regions, which respectively correspond to the four side surfaces II', III', IV' and V', and are respectively referred to as regions II, III, IV and V;

projecting the rectangular plane I' with the resolution of $W_{I'} \times H_{I'}$ contained in the two-dimensional image or video B onto the main viewpoint I of the spherical surface, and projecting the four isosceles triangular planes II', III', IV' and V' contained in the two-dimensional image or video B onto the non-main viewpoints II, III, IV and V of the spherical surface;

the values of the parameters θ, $W_{I'}$, $H_{I'}$, $W_{II'}$, $H_{II'}$, $β_1$, $β_2$ and $β_3$ are obtained from a bit stream.

8. The panoramic video inverse mapping method of claim 7, wherein, projecting a planar image or video B back to the spherical surface comprises performing the following operations on all points on the spherical surface:

first step: according to the coordinate of the point on the spherical surface, "Coordinate", and the values of $β_1$, $β_2$, and $β_3$, determining which one of the regions I, II, III, IV and V the point is located in; if the point is in region I, go to the second step; if the point is in region II, III, IV, or V, go to the fifth step;

second step: the point whose spherical coordinate is "Coordinate" is denoted as $A_{I'}$, the connecting lines between the midpoints of the opposite base edges of the quadrangular pyramid Q' are denoted as $m_1$ and $m_2$, and the projections of the point $A_{I'}$ on $m_1$ and $m_2$ are respectively denoted as $B_{I'}$ and $C_{I'}$, and the center of the bottom plane of the quadrangular pyramid Q' is denoted as D; and calculating a magnitudes of the angle $B_{I'}OD$ and a magnitude of the angle $C_{I'}OD$ according to the coordinate of $A_{I'}$, "Coordinate", and the values of $β_1$, $β_2$ and $β_3$;

third step: calculating the value of the plane coordinate ($X_{I'}$, $Y_{I'}$) according to the magnitudes of the angle $B_{I'}OD$ and the angle $C_{I'}OD$, wherein, the value of $X_{I'}$ and the magnitude of the angle $B_{I'}OD$ are in a relationship of a linear function, and the value of $Y_{I'}$ and the magnitude of the angle $C_{I'}OD$ are in a relationship of a linear function;

fourth step: using the pixel value at ($X_{I'}$, $Y_{I'}$) on the rectangular plane I', or the pixel value obtained by interpolation based on neighboring pixels, as the pixel value whose coordinate is "Coordinate" on the spherical surface; omit the subsequent steps;

fifth step: the point whose spherical coordinate is "Coordinate" is denoted as $A_{II'}$, and, the connecting line between the midpoint of the base edge of the side surface and the apex of the quadrangular pyramid Q' is denoted as $n_1$, and the plane passing $n_1$ and the sphere center O is denoted as $α_3$, and the connecting line between the center of the bottom plane and the apex of the quadrangular pyramid Q' is denoted as $n_2$, and the projections of point $A_{II'}$ on $α_3$ and $n_2$ are denoted as $B_{II'}$ and $C_{II'}$, respectively, and the center of the bottom plane of the quadrangular pyramid Q' is denoted as D; calculating a magnitudes of the angle $B_{II'}OD$ and a magnitude of the angle $A_{II'}C_{II'}B_{II'}$ according to the coordinate of $A_{II'}$, "Coordinate", and the values of $β_1$, $β_2$ and $β_3$;

sixth step: calculating the value of the plane coordinate ($X_{II'}$, $Y_{II'}$) according to the magnitudes of the angle $B_{II'}OD$ and the angle $A_{II'}C_{II'}B_{II'}$, the value of $Y_{II'}$ and the magnitude of the angle $A_{II'}C_{II'}B_{II'}$ are in a relationship of a linear function, and the relationship between the magnitude of the angle $B_{II'}OD$ and the value of $X_{II'}$ is $\angle B_{II'}OD = f(X_{II'})$, the f function can be any function that satisfies the following conditions:

$θ = f(0)$ $180° = f(H)$ wherein, H is the height of the isosceles triangle, and the heights of the four isosceles triangular planes II', III', IV' and V' are respectively $$\frac{H_{II'}}{2}, \frac{W_{II'}}{2}, \frac{H_{II'}}{2}, \frac{W_{II'}}{2};$$

seventh step: use the pixel value at $(X_{II'}, Y_{II'})$ on the triangular plane, or the pixel value obtained by interpolation based on neighboring pixels, as the pixel value of the point with the coordinate "Coordinate" on the spherical surface;

performing the processes from the first step to the seventh step on all points on the spherical surface, thereby obtaining a panoramic image of the spherical surface.

9. The panoramic video inverse mapping method of claim 8, wherein, in the sixth step, $f(X_{II'})$ is:

$$f(X_{II'}) = \theta + (180° - \theta) \times \frac{\tan(X_{II'} \div H \times 180° \times C)}{\tan(180° \times C)}$$

wherein, C is a constant that is greater than 0 and less than 0.5.

* * * * *